June 16, 1964 G. UNO AGNE CARREBERG 3,137,526
TAKE-UP DEVICES FOR SAFETY BELTS
Filed Dec. 15, 1961 2 Sheets-Sheet 1

Inventor:
Gustaf Uno Agne Carreberg
By
Karl W. Flocks
Attorney

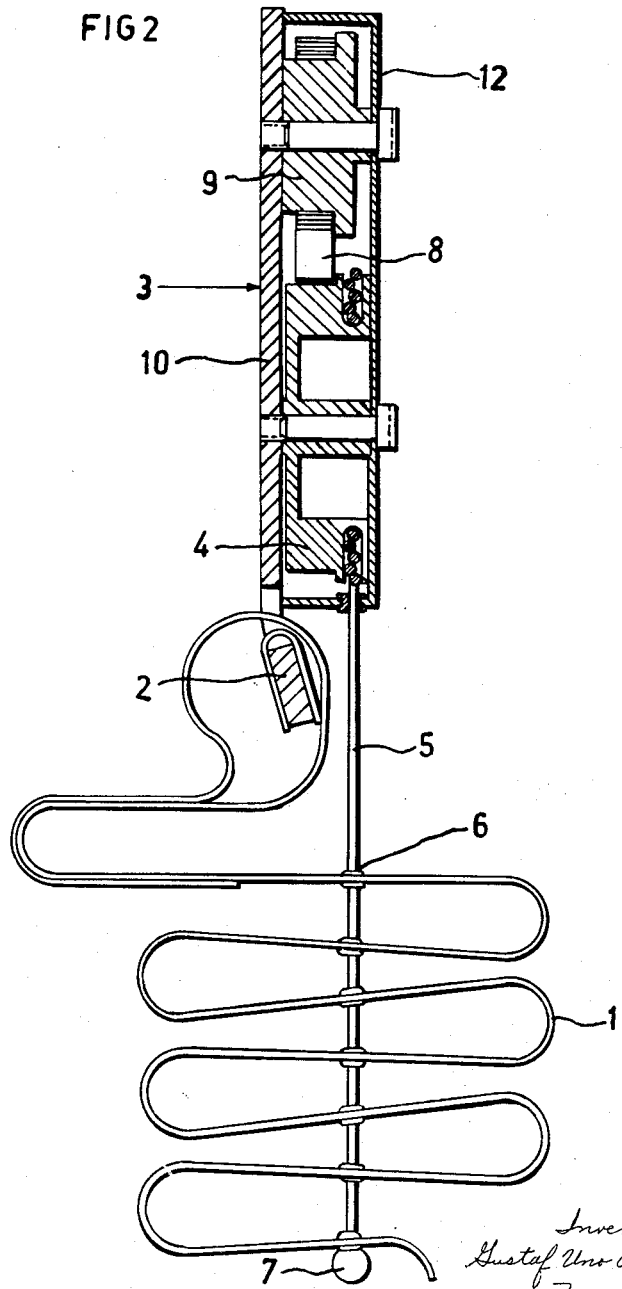

United States Patent Office 3,137,526
Patented June 16, 1964

3,137,526
TAKE-UP DEVICES FOR SAFETY BELTS
Gustaf Uno Agne Carreberg, Ringvagen, Monsteras, Sweden, assignor to Aktiebolaget Industrifjadrar, Monsteras, Sweden, a corporation of Sweden
Filed Dec. 15, 1961, Ser. No. 159,534
Claims priority, application Sweden Oct. 13, 1961
3 Claims. (Cl. 297—388)

This invention relates to a device for taking up a safety belt or part thereof at or adjacent an anchorage point for the belt when the latter is not used. The principal characteristic feature of the invention is that it consists of a take-up device separate from the anchorage point for the safety belt so that the safety function of the belt is independent of the function of the take-up apparatus. Thus, in the event that any constituent detail of the take-up device breaks or fails to operate, the safety function of the belt remains unchanged. Therefore the take-up device is not subjected to any load when the safety belt is stressed on braking and at collisions, for which reason the take-up device may be of weak design.

According to a characteristic feature of the invention the take-up device includes at least one spring which tends to move the belt to the position in which it is collected. Said spring according to an extremely important feature of the invention is a so-called constant spring preferably of flat-bar steel. By the provision of the constant spring it is ensured that the person to be retained in his seat by means of the safety belt is not held secured in an inconvenient manner, since the force of the spring is entirely independent of the position and size of the seat occupant.

For a better understanding of the invention an embodiment, chosen by way of example, will be described in more detail in the following, with reference to the accompanying drawings in which:

FIG. 2 is a longitudinal sectional view of the take-up device in FIG. 1.

Figure 1:
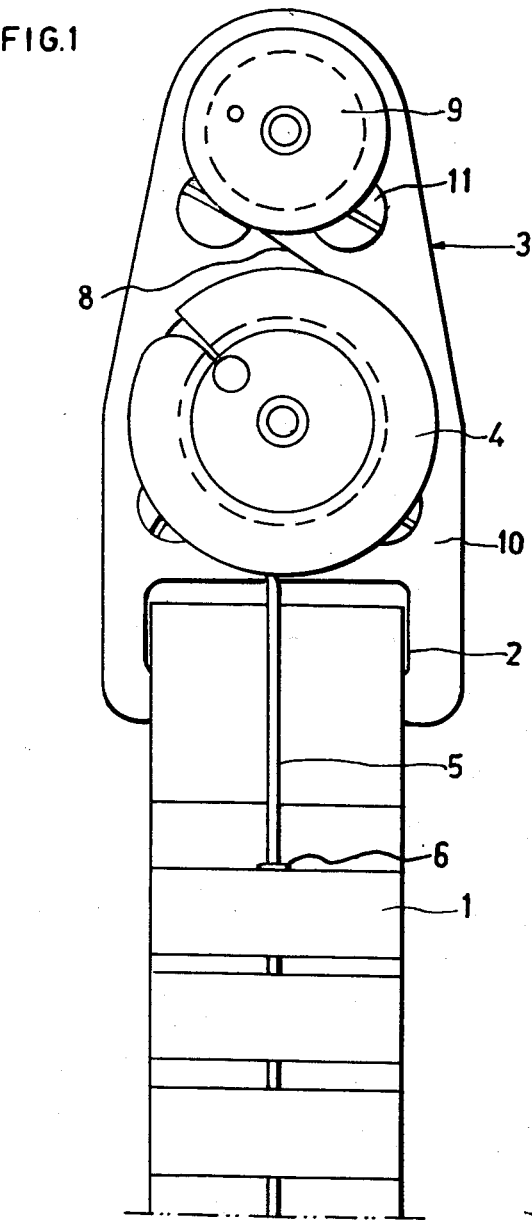
FIG. 1 is a front elevational view of the take-up device with the protective housing removed.

1 designates the safety belt proper which is intended to be collected by the take-up device according to the invention when the belt is not used. The safety belt 1 is primarily intended for motor cars but can also be used in other vehicles such as buses and aircraft. In passenger motor cars the safety belt can be designed for mounting both in connection with the front seat or seats and in connection with the rear seat, the position of the anchorage point or points 2 being dependent on the particular construction of the safety belt 1. Thus, anchorage point 2 can be placed adjacent the roof structure of the car or adjacent the floor structure at the side wall of the car. Said point may also be placed for instance between the front seats.

The device according to the invention is constituted by a take-up device 3 separate from the anchorage point 2 for the safety belt 1 so that the safety function of the belt is independent of the function of the take-up device 3.

In the embodiment illustrated the device 3 comprises a drum 4 or like member for a cable 5 which passes through holes 6 in the belt 1 in such a way that in reeled-in position it keepts the belt 1 or at least part thereof in zig-zag folded position. The cable 5 has its end 7 designed in such a way that said end cannot be pulled through the holes 6 in the safety belt 1. This can be realized for instance by providing a ball at the end 7 of the cable 5.

The take-up device 3 includes a spring 8 which tends to move the belt 1 to the position in which it is collected. The spring 8 thus tends to wind the cable 5 onto the drum 4.

The spring 8 is a so-called constant spring which is made from flat-bar steel, and is adapted to cooperate with two juxtaposed wheels 4 and 9, one of which also forms the drum 4 for the cable 5. The spring 8 is attached to and wound onto the small wheel 9 and secured to the large wheel 4 so that the spring 8 is wound with constant torque onto the wheel 4 when the seat occupant pulls out the belt 1 to fasten it about him. When the safety belt is released the wheel 4 is actuated by the spring 8 so that the cable 5 is wound onto the wheel or drum 4.

As is apparent from the drawings, the anchorage point 2 for the belt 1 is provided in a strong plate 10 which can be secured e.g. by screws 11 at the desired point in the motor car. The plate 10 thus serves to take up all load to which the safety belt 1 is subjected and the plate 10 also constitutes the bottom plate of the take-up device 3 which preferably includes a protective housing 12 for the constituent details thereof.

The above embodiment of the invention was described for purpose of illustration rather than limitation. All possible variations and modifications of the invention are understood as being included within the scope of the appended claims.

I claim:

1. A device for taking up a safety belt or part thereof when the latter is not in use comprising a belt having holes therein provided at predetermined distances from each other in the longitudinal direction of said belt, a fastening member attached to one end of said belt, a spring actuated cable drum mounted on said fastening member, a cable attached on one of its ends to said drum and adapted to wind on said drum, said cable passing alternately from either side of said belt through the holes therein and having a free end remote from said drum, and means on said cable to prevent said free end from pulling through the holes in said belt whereby said belt is taken up in a zig-zag-folded state adjacent to said fastening member when said cable is reeled onto said drum by spring action.

2. A take up device in accordance with claim 1 wherein said spring actuated cable drum includes a spring of flat-bar steel.

3. A device for taking up a safety belt or part thereof when the latter is not in use comprising a belt having holes therein provided at predetermined distances from each other in the longitudinal direction of said belt, a fastening member providing an anchorage point attached to one end of said belt, a cable passing alternately from either side of said belt through the holes therein and having a free end and means on said free end to prevent said free end from pulling through the holes in said belt, a spring actuated anchored cable drum attached to said cable on the end other than said free end and adapted to receive said cable wound thereon whereby said belt is taken up in a zig-zag-folded state adjacent to said fastening member when said cable is reeled onto said drum by spring action.

References Cited in the file of this patent

UNITED STATES PATENTS

| | | |
|---|---|---|
| 2,159,734 | French | May 23, 1939 |
| 2,195,334 | Lethern | Mar. 26, 1940 |
| 2,260,101 | DeFalco | Oct. 21, 1941 |
| 2,945,921 | Belicka | July 19, 1960 |
| 2,963,080 | Zang | Dec. 6, 1960 |
| 3,020,567 | Colt | Feb. 13, 1962 |
| 3,032,374 | Robinson | May 1, 1962 |